(12) United States Patent
Tullberg

(10) Patent No.: US 8,384,830 B2
(45) Date of Patent: Feb. 26, 2013

(54) PRE-ALARM VIDEO BUFFER

(75) Inventor: Joacim Tullberg, Lund (SE)

(73) Assignee: Axis AB, Lund (SE)

( * ) Notice: Subject to any disclaimer, the term of this patent is extended or adjusted under 35 U.S.C. 154(b) by 1433 days.

(21) Appl. No.: 11/775,013

(22) Filed: Jul. 9, 2007

(65) Prior Publication Data

US 2008/0198268 A1 Aug. 21, 2008

(30) Foreign Application Priority Data

Jul. 13, 2006 (EP) .................................. 06117141

(51) Int. Cl.
*H04N 7/18* (2006.01)
(52) U.S. Cl. ........................ 348/659; 345/545
(58) Field of Classification Search ................. 348/659, 348/E07.085, 143; 345/546
See application file for complete search history.

(56) References Cited

U.S. PATENT DOCUMENTS

| 4,630,124 | A | * | 12/1986 | Endoh et al. ............. 358/426.02 |
| 5,982,418 | A | | 11/1999 | Ely |
| 6,069,653 | A | * | 5/2000 | Hudson .......................... 348/143 |
| 6,327,421 | B1 | | 12/2001 | Tiwari et al. |
| 6,791,602 | B1 | | 9/2004 | Sasaki et al. |
| 7,124,427 | B1 | * | 10/2006 | Esbensen ....................... 725/109 |
| 7,688,890 | B2 | * | 3/2010 | Kondo et al. ............. 375/240.03 |
| 8,233,042 | B2 | * | 7/2012 | Jung et al. ..................... 348/143 |
| 2002/0030740 | A1 | * | 3/2002 | Arazi et al. ................... 348/143 |
| 2003/0169817 | A1 | | 9/2003 | Song et al. |
| 2004/0156549 | A1 | * | 8/2004 | Persiantsev ................... 382/236 |
| 2005/0249287 | A1 | * | 11/2005 | Kondo et al. ............ 375/240.16 |
| 2006/0013310 | A1 | * | 1/2006 | Lee et al. ................. 375/240.16 |
| 2007/0097215 | A1 | * | 5/2007 | Jung et al. .................. 348/207.1 |
| 2007/0160143 | A1 | * | 7/2007 | Lee ........................... 375/240.15 |
| 2008/0036916 | A1 | * | 2/2008 | Sakamoto ..................... 348/699 |

FOREIGN PATENT DOCUMENTS

| DE | 19749182 A1 | 5/1999 |
| EP | 1150509 A2 | 10/2001 |
| WO | 9613122 A1 | 5/1996 |
| WO | 0072573 A2 | 11/2000 |
| WO | 0228097 A2 | 4/2002 |

OTHER PUBLICATIONS

Li et al., "Core-stateless fair rate estimation fair queuing," MILCOM 2002. Proceedings , vol. 2, No., pp. 1165-1170 vol. 2, Oct. 7-10, 2002.*

* cited by examiner

*Primary Examiner* — Wing F Chan
*Assistant Examiner* — Kostas Katsikis
(74) *Attorney, Agent, or Firm* — Volpe and Koenig, P.C.

(57) ABSTRACT

A method for buffering an alarm video sequence includes receiving input image frames from an input video stream comprising full image frames and differential image frames, storing the received input image frames, and generating an output alarm video sequence by combining at least one full image frame with the input image frames stored in the buffer. The full image frame may be inserted as a first image frame in the output alarm video sequence.

20 Claims, 13 Drawing Sheets

PRE-ALARM VIDEO BUFFER

TECHNICAL FIELD OF THE INVENTION

The present invention relates to buffering of a video sequence. More particularly, the invention relates to a method for buffering a video sequence comprising full image frames and differential image frames. The invention also relates to a pre-alarm buffer, a video server, a surveillance camera and a computer program.

BACKGROUND OF THE INVENTION

A modern security system often comprises a number of surveillance cameras. The surveillance cameras give the security personnel a possibility to monitor a large area, such as several floors in an office building. They also give security personnel a good instrument for verifying that an alarm is a true alarm before taking any further actions.

Some security systems are arranged to record a video sequence from a time period starting before a detection, e.g. an alarm, and ending at the time of the detection. This type of video sequence is referred to as a pre-alarm video sequence. Of course, such security systems may record a video sequence starting at the time of the detection and ending at an arbitrary time as well. This type of video sequence is referred to as a post-alarm video sequence. The recorded pre-alarm video sequences may facilitate verification of whether the detection is due to a true alarm event or not and may provide video on the event preceding the detection.

Since video sequences generally are compressed according to some compression standard, e.g. MPEG-4, characteristics of the specific compression scheme have to be considered.

For example, a common basic principle of video compression is to replace some full image frames by differential image frames, wherein a differential image frame contains the difference between the preceding full image frame and the replaced full image frame and a full image frame contains complete image data. In this way all information describing each full image frame does not have to be stored or sent, but only the differences between the present frame and a previous frame have to be stored or sent which in turn means that less data has to be stored or sent.

Accordingly, when decompressing the compressed video stream a differential image frame is combined with the present image and is thus recreating the image represented by the differential image.

Generally, such a compressed video sequence or such a compressed video stream is provided with a number of full image frames and in-between the full image frames is a number of differential image frames arranged. The number of differential image frames between two adjacent full image frames depends on the desired compression rate and/or quality.

For example, a first frame is a full image frame, a second, a third and a fourth frame are differential image frames, a fifth frame is a full image frame, a sixth, a seventh and an eighth frame are differential image frames, and so on. The first frame contains information of a complete image, and does not need to be combined with image information from another frame in order to represent a complete image. However, in order to achieve the next complete image the first frame, containing full image data, and the second differential image frame, containing the differences between the first image and the second image, are combined into a second image frame representing the second complete image. In order to achieve a third full image frame the second complete image and the third differential image frame are combined into a third complete image, and so on until the fifth frame, which is a full image frame, whereas the procedure is repeated.

In some compression schemes based on the common principle described above, different types of differential image frames are used, such as P-frames and B-frames in the MPEG standards which are standards well known to the person skilled in the art.

Hence, when retrieving a pre-alarm video sequence from a pre-alarm buffer, e.g. from a first-in-first-out (FIFO) buffer, the video sequence in the buffer may begin with a number of differential image frames, which means that the initial frames of a video sequence do not contain enough information for presenting complete images.

One alternative is to present all of the frames in the pre-alarm buffer to the operator, including the first differential frames. Since the full image frame that these differential images are based on is not present, the first frames of the pre-alarm video sequence will not present correct image information.

Another solution is to introduce an electric device, which locates the first full image frame of the pre-alarm video sequence. In this way, the memory usage is more efficient and no frame containing correct image information is lost.

One drawback with this is that the length of the pre-alarm video sequence will vary from time to time, e.g. if a pre-alarm sequence of 10 seconds is selected and the video sequence includes reasonably many differential frames, then there may be 4 seconds of non usable differential video frames at the beginning of the pre-alarm video sequence.

One solution to solve this problem may be to expand the buffer. In this way a number of extra frames may be stored, i.e. the start of the pre-alarm video sequence is transferred back in time. Then, it is possible to select the number of extra frames so that all the image frames representing the selected pre-alarm time period may be decompressed.

This solution has some drawbacks. Firstly, the length of the pre-alarm video sequence will vary from time to time. Secondly, the number of added extra frames required is dependent on the compression rate, since a higher compression rate often means more differential image frames and less full image frames. Hence, the number of added extra frames must be high in order to support a video sequence having high compression rate.

SUMMARY OF THE INVENTION

In view of the above, the invention solves or at least reduces the problems discussed above.

Embodiments are described including a method for buffering a pre-alarm video sequence, a pre-alarm buffer, a video server, a camera, a computer readable medium, and a method for generating a pre-alarm video sequence.

According to a first aspect of the invention there is provided a method for buffering a video sequence comprising the acts of:

receiving input image frames from an input video stream comprising full image frames and differential image frames, storing each received input image frame in a video sequence FIFO buffer in response to the receipt of each frame, storing at least one full image frame, being related to the video sequence stored in the video sequence FIFO buffer, in a full image FIFO buffer, and generating an output video sequence by combining at least one of said stored at least one full image frames from the full image frame FIFO buffer with the image frames of the video sequence FIFO buffer.

An advantage of storing the received input image frames in a video sequence FIFO buffer and at least one full image frame, being related to the video sequence stored in the video sequence FIFO buffer, in a full image FIFO buffer is that it becomes possible to combine the video sequence of the video sequence buffer with a full image frame in order to minimize the negative effect of the initial frames of the video sequence buffer being differential frames in the output video sequence. In other words, a differential image frame that makes it difficult or even impossible to use substantially all the video frames of the video sequence FIFO buffer for creating a viewable video sequence may be replaced by a full image frame. Thereby making it possible to effectively use the image information stored in the video sequence FIFO buffer.

In another embodiment of the first aspect of the invention, said at least one full image frame stored in the full image frame FIFO buffer is a full image representation of an image frame stored in said video sequence FIFO buffer.

In this way it becomes possible to further decrease the negative effect of possible initial differential image frames in the video sequence buffer by using image information relevant for the particular video sequence. Accordingly, by combining such a full image frame with the video sequence of the video sequence buffer it is possible to utilize the information in the image frames of the video sequence buffer in order to generate a more true representation of the pre-alarm video sequence.

In yet another embodiment said at least one full image frame stored in the full image frame FIFO buffer is a full image representation of an image frame having a short temporal distance to the oldest image frame of the video sequence stored in the video sequence FIFO buffer.

By means of this arrangement the full image frame may be a full image representation of the oldest image frame in the video sequence buffer or a full image representation of an image temporarily close to the oldest image in the video sequence buffer. The advantages are the same as mentioned above.

In one embodiment of the invention the generation of a pre-alarm video sequence comprises inserting a full image frame from a full image FIFO buffer as the first frame of a video sequence outputted from a video sequence FIFO buffer comprising full image frames and differential image frames.

The advantage of inserting a full image frame first in the video sequence of the video sequence buffer is that the initial differential image frames of the video stream may be made part of the viewable video sequence, as the image information of the initial differential image frames now is possible to interpret. Thereby the buffer may be more efficiently used, the length of the pre-alarm video sequence may be more exactly predicted, and the point in time of the first image frame of the pre-alarm video sequence may be more accurately determined. Further advantages are achieved in an embodiment in which the full image frame inserted first in the output video sequence is a full image frame of a differential frame in the video sequence and in which the temporal distance between the differential frame and the initial differential frame of the output video sequence is small or non existing. In such case all image frames of the video sequence FIFO buffer are effectively used as all of them are viewable as part of a compressed video sequence starting with a full image frame.

In still another embodiment, the generation of an output video sequence is automatically made upon the reception of a detection signal.

An advantage of this is that no user interaction is required and that a video sequence showing what has happened just before the detection is sent automatically.

According to a further embodiment of the invention the method further comprises frequently receiving full image frames from a video sequence encoding means outputting the video stream including the input image frames, each full image frame representing a full image version of an image frame of the input image frames, and wherein the storing of at least one full image frame includes storing each of the received full image frames in the full image FIFO buffer in response to the receipt of each full image frame.

By receiving the full image frames to be buffered in the full image FIFO buffer directly from the video sequence encoding means, less processing capacity is required by the pre-alarm buffering procedure. This is particularly advantageous in an embodiment where the pre-alarm buffering is performed in the same device as the encoding of the video sequence. The reason for this is that the encoder already has access to such full image frames.

According to another embodiment said storing of at least one full image frame in a full image FIFO buffer comprises combining at least one image frame of said received input image frames with said at least one full image frame, said at least one image frame of said received input image frames being a differential image and representing a later image frame in the video sequence than the at least one full image frame is representing, and storing said combined image frames in the full image FIFO buffer.

The advantage of producing the full image frames for the full image FIFO buffer from the video input to be stored in the video sequence FIFO buffer is that it becomes possible to use the invention in devices that only have access to the compressed video sequences that are to be stored in the video sequence FIFO buffer.

According to another aspect of the invention a pre-alarm buffer for buffering a video sequence is provided.

Said pre-alarm buffer comprises a video sequence FIFO buffer arranged to buffer input image frames from an input video stream, a full image FIFO buffer arranged to buffer at least one full image frame, being related to the video sequence FIFO buffer, a combiner arranged to combine an image frame from the full image FIFO buffer with the image frames of the first FIFO buffer and to generate a pre-alarm video sequence.

In one embodiment said at least one full image frame stored in the full image frame FIFO buffer is a full image representation of an image frame stored in said video sequence FIFO buffer.

In another embodiment said at least one full image frame stored in the full image frame FIFO buffer is a full image representation of an image frame having a short temporal distance to the oldest image frame of the video sequence stored in the video sequence FIFO buffer.

In yet another embodiment the combiner is arranged to insert a full image frame from a full image FIFO buffer as the first frame of a video sequence outputted from a video sequence FIFO buffer comprising full image frames and differential image frames.

In a further embodiment the pre-alarm buffer further comprises a compressed video input arranged to receive a video sequence including full frames and differential frames.

In another embodiment the pre-alarm buffer further comprises a full frame video input arranged to receive a video sequence including only full frames.

The advantages of the embodiments of this aspect of the invention are similar to the advantages presented in connection with corresponding embodiments of the first aspect of the invention.

According to a third aspect, the invention is provided by a video server comprising a pre-alarm buffer as mentioned above.

According to a fourth aspect, the invention is provided by a camera comprising a pre-alarm buffer as mentioned above.

According to a fifth aspect, the invention is provided by a computer program, comprising computer program code for performing the steps of the method as being described above.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF THE INVENTION

Throughout the document the wordings "full image frame" and "differential image frame" are used. A "full image frame" is to be interpreted as an image, which is independent of other images, and a "differential image frame" is to be interpreted as an image only comprising the differences between two consecutive images, i.e. as being dependent on other images.

Further, the wording "compressed video stream/sequence" is to be interpreted as a video stream/sequence comprising a number of image frames, which are collectively compressed. Such a collective compression is e.g. to take the similarities between consecutive image frames into account by replacing some image frames with differential image frames.

Moreover, the wording "compressed image" is to be interpreted as an individually compressed image where the compressible information within the image has been taken into account, such a compression format is e.g. JPEG.

Additionally, a "compressed video stream/sequence" may comprise "compressed images", i.e. the information is reduced both by taking similarities between consecutive images into account, as well as taking the compressible information within each of the images into account. Such a compression format is the MPEG-4 standard.

Figure 1:
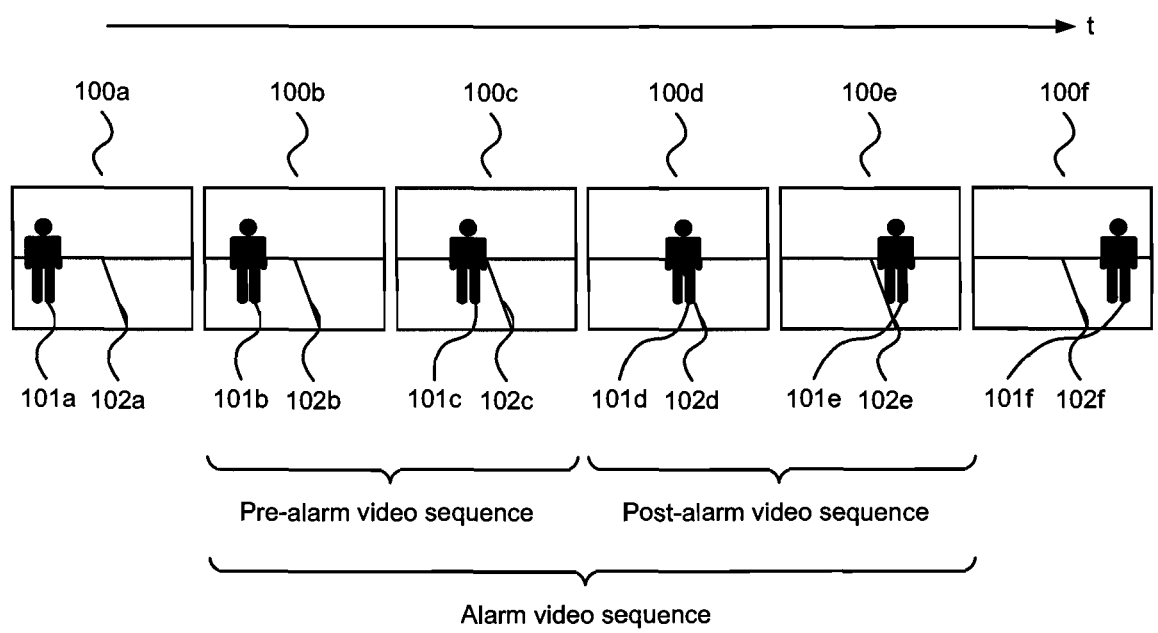
FIG. 1 is an illustration of an alarm video sequence.

FIG. 1 illustrates a number of image frames 100a-100f forming a video sequence. In each of the image frames a man 101a-101f and a detection line 102a-102f, which is connected to a detector (not shown), are present.

In the fourth image frame 100d, the man 101d is crossing the detection line 102d, wherein a detection signal is transmitted from the detector. When the detection signal is received by the camera, an alarm video sequence is generated. The generated video sequence is associated with the alarm and sent to the operator. This may for instance be useful in an experiment, in which the events before the detection are interesting as well as the events after the detection.

Another example of when these types of pre-alarm and post-alarm video sequences may be useful is within the manufacturing industry. If for instance, an interrupt signal of an assembly line is associated with a camera with a pre-alarm video sequence option, the cause of the interrupt signal can be studied and appropriate actions can be taken in order to reduce the risk of similar interrupt signals.

Still another example, as mentioned above, is within security. By having pre-alarm and post-alarm video sequences associated with the detections of a surveillance camera, the handling of the detections as well as the analysis of the detections is facilitated.

The alarm video sequence comprises two parts; a pre-alarm video sequence showing the events before the detection and a post-alarm video sequence showing the events after the detection. The lengths of these two sequences are preferably user adjustable.

Further, the length of the post-alarm video sequence does not have to be specified prior to the alarm. It may e.g. record until an operator stops it.

In the illustrative example in FIG. 1, both the pre-alarm video sequence and post-alarm video sequence are set to contain two frames. However, in an actual case the number of frames can be much higher, e.g. 10 to 300 frames, which corresponds to 1 to 30 seconds with a frame rate of 10 frames per second (fps). The number of frames and the frame rate may vary for different applications.

It should also be understood that the handling of pre-alarm and post-alarm video sequences can be made by a video server or other apparatus suitable for handling video sequences.

Alternatively, instead of being a part of the post-alarm video sequence, the image frame 100d in which the detection is made, can be a part of the pre-alarm video sequence.

In FIG. 1 the image frames 100a-100f are illustrated as independent images, or in other words full image frames, i.e. each of the image frames may be viewed without requiring image information from other image frames. However, video sequences represented digitally are preferably compressed in order to reduce the amount of information to be stored and transmitted.

There is a number of ways to compress digital video sequences. However, a common way to compress a raw video sequence. i.e. uncompressed video sequence, is to convert the frames of the raw video sequence into full image frames and differential image frames, which will be explained in detail below. In this application, this type of compression is considered.

In order to reduce the information in the image frames, digital video formats that benefit from the similarities between adjacent images have been developed, such as MPEG-4.

Figure 2:
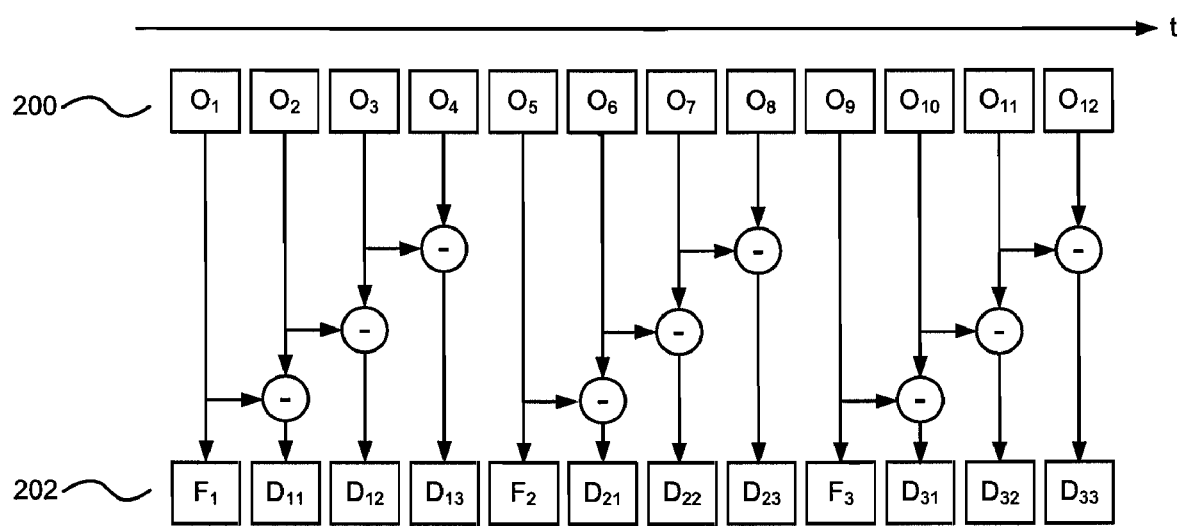
FIG. 2 is a schematic illustration of a common video compression algorithm.

FIG. 2 illustrates the general principle of compressing an original video sequence 200 comprising original full image frames, denoted $O_1$-$O_{12}$, to a compressed video sequence 202 comprising full image frames, denoted $F_1$-$F_3$, and differential image frames, denoted $D_{11}$-$D_{13}$, $D_{21}$-$D_{23}$ and $D_{31}$-$D_{33}$.

In this compression principle, some of the image frames in the video sequence are reduced to only contain the differences from the preceding image instead of complete image information. These frames are herein referred to as differential image frames, and they may, in a somewhat simplified model, be determined by subtraction as illustrated in FIG. 2.

Figure 3:
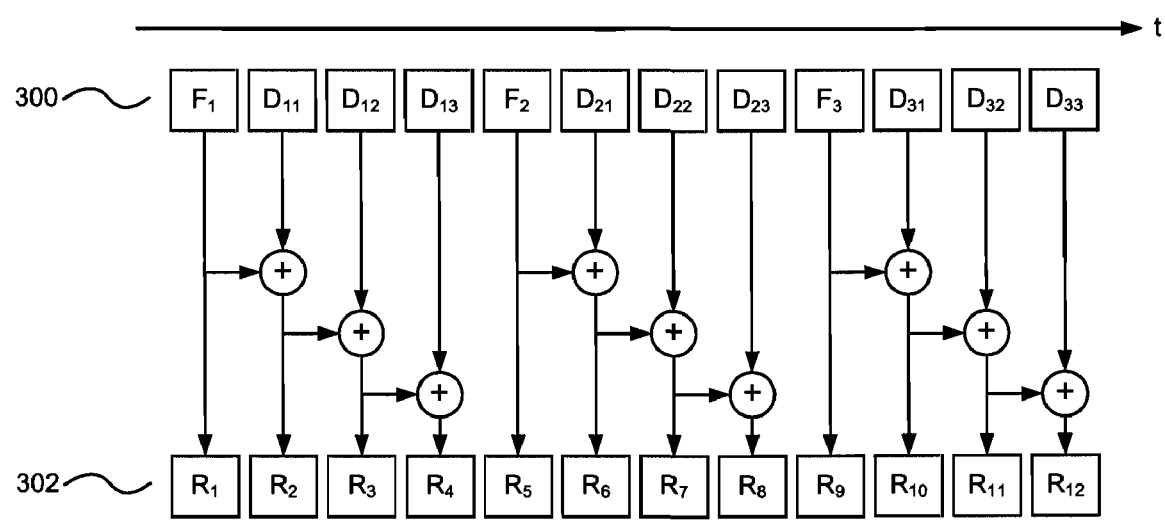
FIG. 3 is a schematic illustration of a common video decompression algorithm.

FIG. 3 illustrates the general principle of decompressing the compressed video sequence 300 to a decompressed video sequence 302 comprising recreated full image frames, denoted $R_1$-$R_{12}$.

According to this decompression principle the differential image frames may, in a somewhat simplified model, be transformed to full image frames by addition as illustrated in FIG. 3.

This general principle may be refined by having different types of differential image frames, such as B- and P-frames in the MPEG-4 standard, and the full image frames may also be processed, e.g. compressed, such as I-frames in the MPEG-4 standard.

As can be understood from the illustrative examples described above, in order to view the entire sequence stored in the pre-alarm video buffer, the first image frame should be a full image frame, which is not always the case if a fixed number of frames of a compressed video sequence are stored in a FIFO pre-alarm video sequence buffer.

Figure 4:
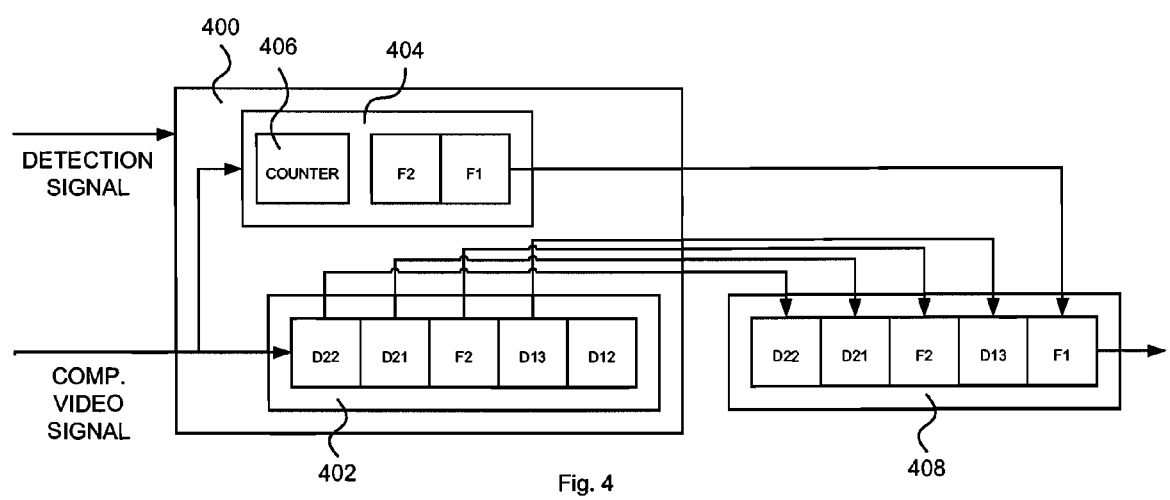
FIG. 4 is a schematic illustration of a first embodiment of the functionality of a pre-alarm video sequence buffer.

In FIG. 4, the general principle of a first embodiment of the present invention is illustrated. A compressed video signal, i.e. full image frames and differential image frames, is sequentially input to a pre-alarm video sequence buffer 400 comprising a buffer 402 buffering compressed video, the buffer 402 or corresponding buffers are sometimes in this application referred to as video sequence FIFO buffers, and a buffer 404 buffering full image frames only, the buffer 404 or corresponding buffers are sometimes in this application referred to as full frame FIFO buffers.

Each input frame from the video signal is stored in the buffer 402. When the buffer becomes full the oldest frame is removed in accordance with the FIFO principle, FIFO.

When a new full image frame is received, the full image frame in the buffer 404 is updated. In order to keep track of when a new full image frame is received a counter 406 can be utilized.

When a detection signal reaches the pre-alarm video sequence buffer the oldest full image frame in the buffer 404 and the compressed video sequence in the buffer 402 are output to a combiner 408. The combiner 408 generates a new video sequence by replacing the first image frame of the video sequence in buffer 402 with the first image frame in the buffer 404. Hence, if the first image frame of the buffer 404 is a differential image frame, the first image frame of the buffer 404 always being a full image frame of which the first differential image frame of buffer 402 is based upon.

This solution is suitable when having a small number of intermediate differential frames in the compressed video signal, i.e. few differential image frames between the full image frames.

For example, if there are 75 differential image frames between two consecutive full image frames, the skip between the first and the second image frames in the pre-alarm video buffer may be quite substantial in the worst case scenario where 74 differential image frames are missing. However, if there are 4 differential image frames between two consecutive full image frames, the skip is not that substantial, since the worst case scenario for this case only represents 3 missing differential image frames.

Alternatively, a check may be made if the oldest frame of the compressed video buffer is a full image frame or not. If the oldest frame is a full image frame, the compressed video sequence in the compressed video sequence buffer 402 is output without adjustments, else if the oldest frame is not a full image frame, this is replaced by a full image frame retrieved from the full image frame buffer 404 as described above.

By having the most recent full image frame in the full image video buffer, the procedure in the combiner is always the same, implicating less computational time, which in turn results in improved processing efficiency.

Figure 5:
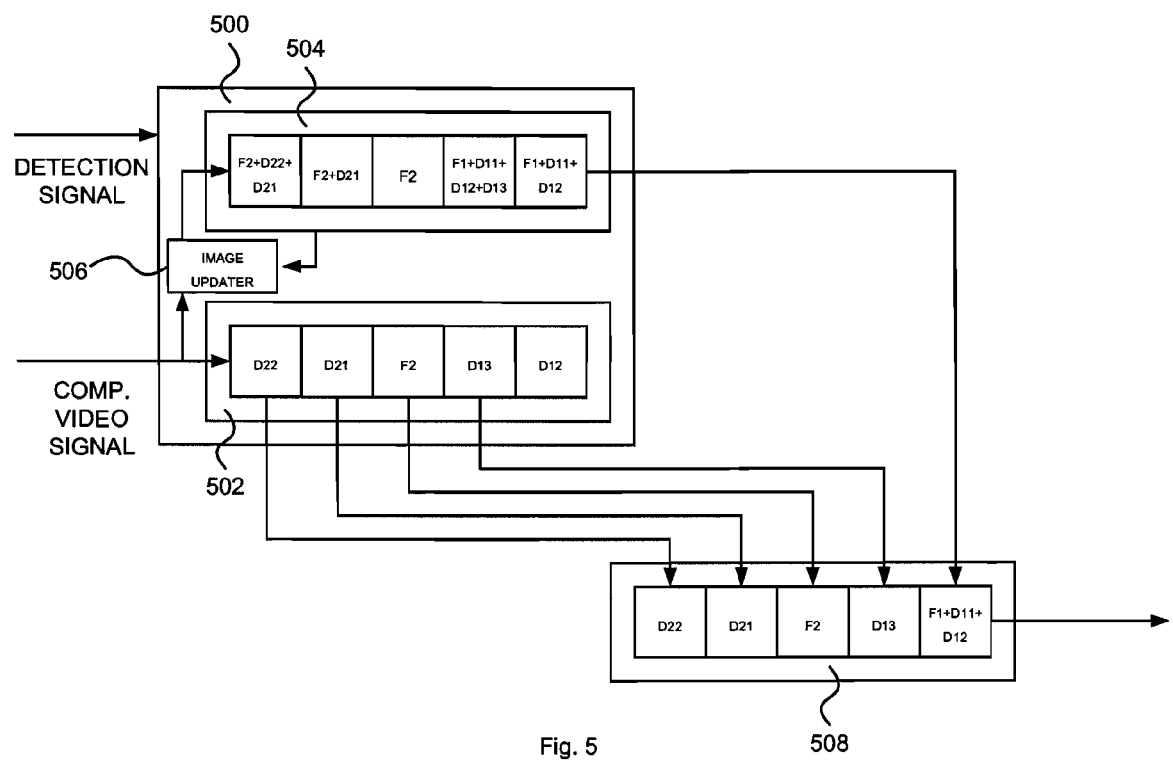
FIG. 5 is a schematic illustration of a second embodiment of the functionality of a pre-alarm video sequence buffer.

In FIG. 5, a second embodiment of the invention is illustrated. Briefly, a compressed video signal is sequentially input to a pre-alarm video sequence buffer 500 comprising a buffer 502 buffering compressed video, a buffer 504 buffering full image frames and an image updater 506. When a detection signal is received a pre-alarm video sequence is generated by a combiner 508.

The general difference between the first and second embodiment is that in the first embodiment the buffer 404 comprises the most recent full image frame for every frame in the buffer 402, but in the second embodiment the buffer 504 comprises a corresponding full image frame for every frame in the buffer 502. This is achieved by the image updater 506, which determines a corresponding full image for every incoming image frame.

When an incoming frame of the compressed video signal is received, the incoming frame is buffered in the buffer 502 and transmitted to the image updater 506. The image updater 506 generates a corresponding full image frame to the incoming image frame by, if the incoming image frame is a differential image frame, combining the received differential image to the most recent full image frame in the buffer 504, else, if the incoming image frame is a full image, no combining is necessary since the incoming image frame already is a full image frame, and hence also its own corresponding full image frame. Thereafter, the buffer 504 is updated with this corresponding full image frame.

When receiving the detection signal a pre-alarm video sequence is generated by the combiner 506 by replacing the first frame of the compressed video buffer 502 with the corresponding full image frame.

Alternatively, a check may be made if the oldest frame of the compressed video buffer is a full image frame or not. If the oldest frame is a full image frame, the compressed video sequence in the buffer 502 is output without adjustments, else if the oldest frame is not a full image frame, it is replaced by a full image frame retrieved from the buffer 504 as described above.

Figure 6:
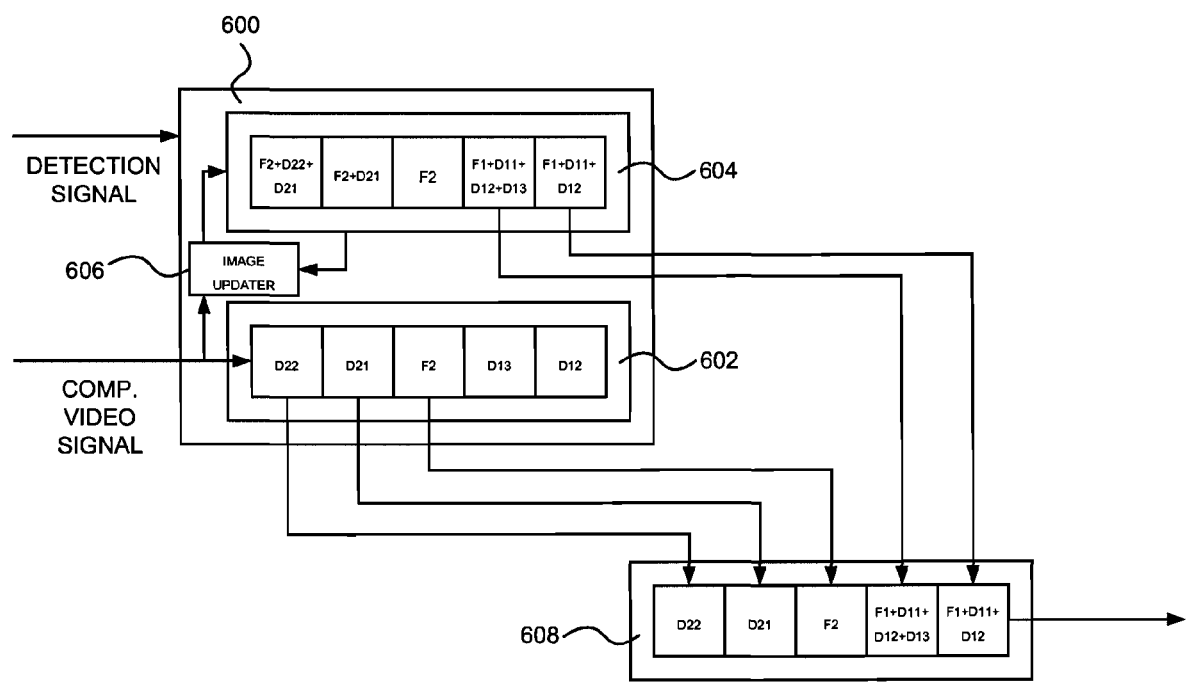
FIG. 6 is a schematic illustration of a third embodiment of the functionality of a pre-alarm video sequence buffer.

In FIG. 6, a third embodiment of the invention is illustrated. As the second embodiment, a compressed video signal is sequentially input to a pre-alarm video sequence buffer 600 comprising a buffer 602 buffering compressed video, a buffer 604 buffering full image frames and an image updater 606. When a detection signal is received a pre-alarm video sequence is generated by a combiner 608.

As in the second embodiment, a corresponding full image frame is determined for every input frame of the compressed video signal. Hence, the buffer 604 has the same appearance as in the second embodiment.

However, unlike the second embodiment, more than one differential frame in the buffer 602 can be replaced by full image frames from the buffer 604.

For instance, if the two first frames of the buffer 602 are differential image frames, these two can be replaced by their corresponding full image frames from the buffer 604.

Alternatively, in order to keep track of the number of frames to be replaced a counter, which indicates the number of frames to be replaced, can be used.

An advantage with this embodiment is that the number of differential image frames in a row is constant, which makes it possible to improve the efficiency of the pre-alarm video buffer.

Figure 7:
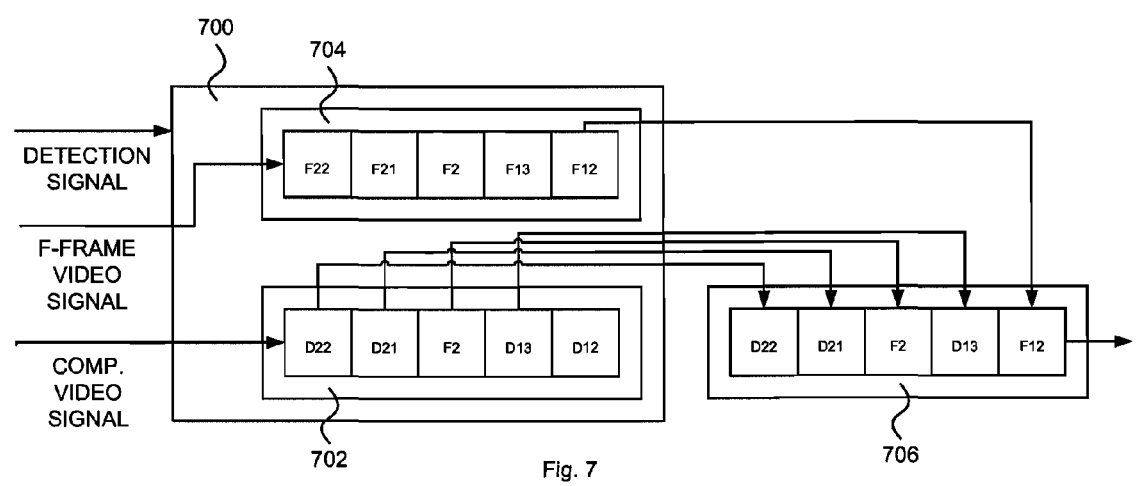
FIG. 7 is a schematic illustration of a fourth embodiment of the functionality of a pre-alarm video sequence buffer.

In FIG. 7, a fourth embodiment of the invention is illustrated. Unlike the embodiments described above, a compressed video signal and a compressed full image frame video signal, herein also referred to as F-frame video signal, are input to a pre-alarm video sequence buffer 700. The compressed video signal comprises compressed full image frames, herein referred to as F-frames, and compressed differential image frames. This compressed video signal can e.g. be a MPEG-4 video sequence. The F-frames and the F-frame video signal may be named I-frames and I-frame video signal in some compression methods.

The F-frame video signal represents the same video sequence as the compressed video signal. The difference is that the F-frame video signal only includes F-frames. Hence, for every image frame in the compressed video signal a corresponding compressed full image frame is present in the F-frame video signal.

The compressed video signal is input to a buffer 702 buffering compressed video and the F-frame video signal is input to a buffer 704 buffering F-frames. Both the buffer 702 and the buffer 704 function according to the FIFO principle.

When a detection signal is received by the pre-alarm video sequence buffer 700, a pre-alarm video sequence is generated in a combiner 706. In the combiner, the first frame of the buffer 702 is replaced by the first frame of the buffer 704.

Figure 8:
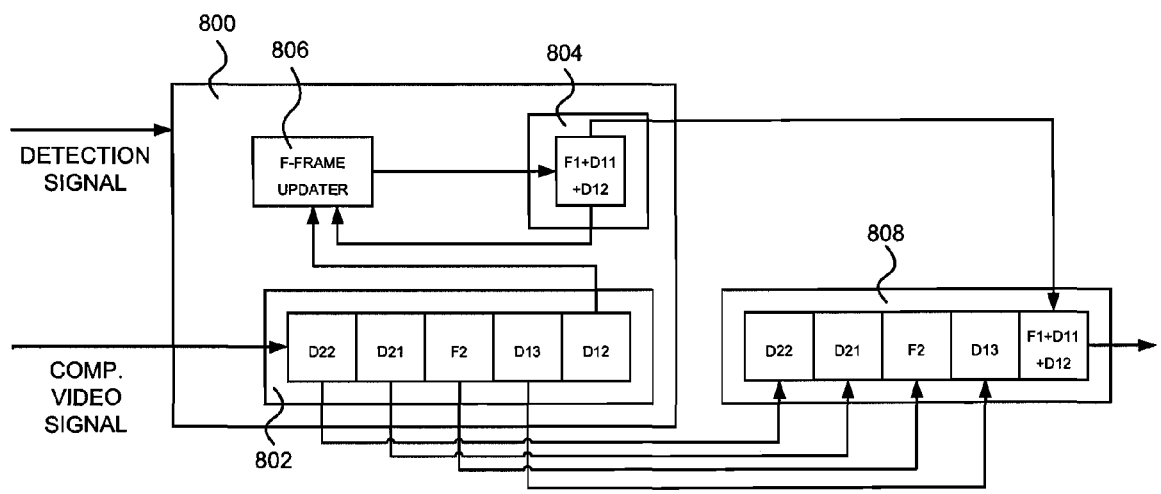
FIG. 8 is a schematic illustration of a fifth embodiment of the functionality of a pre-alarm video sequence buffer.

In FIG. 8, a fifth embodiment of the invention is illustrated. In this embodiment a compressed video signal is input to a buffer 802 buffering compressed video in a pre-alarm video sequence buffer 800. The pre-alarm video sequence buffer 800 also comprises a buffer 804 buffering F-frame video. The buffer 804 only comprises one frame. This frame is updated by an F-frame updater 806, which, if the oldest frame is a differential image frame, combines the oldest frame of the compressed video sequence buffer with the current F-frame, else, if the oldest frame is an F-frame, the current F-frame is replaced by this F-frame. This is done every time a frame in the compressed video signal comes in to the pre-alarm video sequence buffer 800.

When a detection signal is received by the pre-alarm video sequence buffer 800, a pre-alarm video sequence is generated in a combiner 808. In the combiner 808, the first frame of the buffer 802 is replaced by the frame from the buffer 804.

In the embodiments described above the incoming full image frames and differential image frames are treated in the same way, respectively. However, if a small skip is acceptable between the first and second image frame in the pre-alarm video sequence, it is possible to only treat every other incoming frame, or if a somewhat bigger skip is acceptable it is possible to treat only every third frame, and so on. Although, best quality is achieved if all full image frames are treated.

Figure 9:
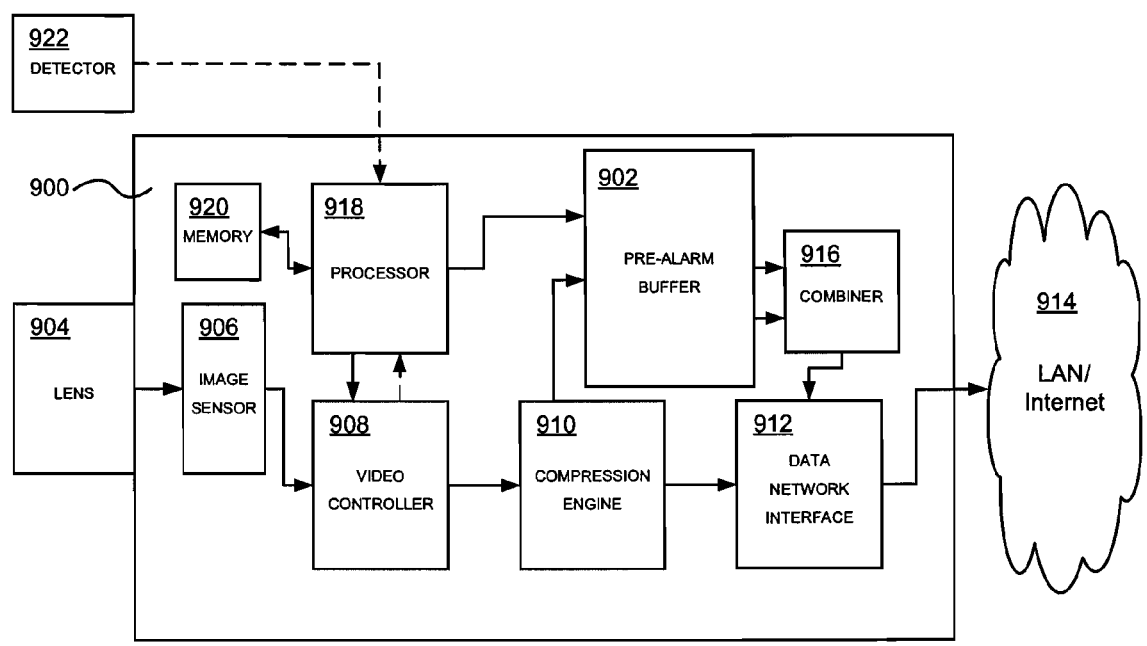
FIG. 9 is a schematic illustration of a surveillance camera comprising a pre-alarm video sequence buffer according to the first embodiment.

In FIG. 9, a camera 900 comprising a pre-alarm video sequence buffer 902, as illustrated in FIG. 4, is illustrated. The camera 900 further comprises a lens 904, an image sensor 906, a video controller 908, a compression engine 910, a data network interface 912 connected to a LAN (Local Area Network) or the Internet 914, a combiner 916, a processor 918 and a memory 920, and possibly an external detector 922.

Briefly, for sending streaming video to a LAN or the Internet 914, light is transferred through the lens 904 to the image sensor 906. In the image sensor 906, which can be a CCD sensor or a CMOS sensor, the light is converted to digital signals. Thereafter, the digital signals are transferred to the video controller 908, which transforms the digital signals into image frames. These image frames are then compressed into a video format, such as MPEG, in the compression engine 910 and finally transferred via the data network interface 912 to the LAN or the Internet 914.

If an alarm video sequence is to be sent automatically upon a detection, both the output image frames, i.e. full image frames, from the video controller 908 and the output compressed image frames from the compression engine 910 are input to the pre-alarm video sequence buffer 902. When a detection is received by the camera, a pre-alarm video sequence is generated by the combiner 916 and the pre-alarm video sequence buffer 902 as illustrated in FIG. 4. The pre-alarm video sequence is transferred to the data network interface 912 and thereafter to the LAN or Internet 914.

During the transfer of the pre-alarm video sequence, a post-alarm video sequence is stored in a memory or buffer (not shown), and when the pre-alarm video sequence has been sent, this post-alarm video sequence is sent. Since the post-alarm video sequence comes right after the pre-alarm video sequence, no special care has to be taken as in the case of the pre-alarm video sequence.

The detection triggering the sending of the pre-alarm video sequence can be input to the camera 900 from the external detector 922. This detector can be a PIR (Passive Infra Red) detector, light beam detector, sound detector, pressure detector or any other detector outputting a signal upon detection. The signal is received by the processor 918 and forwarded to the pre-alarm video sequence buffer 902.

The detection signal can also be achieved by image analysis software programmed for detecting certain situations in the incoming images. This software may be executed by the processor 918 and stored in the memory 920.

After the pre-alarm video sequence has been sent to the LAN or the Internet 914, a post-alarm video sequence is transferred to the LAN or the Internet 914.

Figure 10:
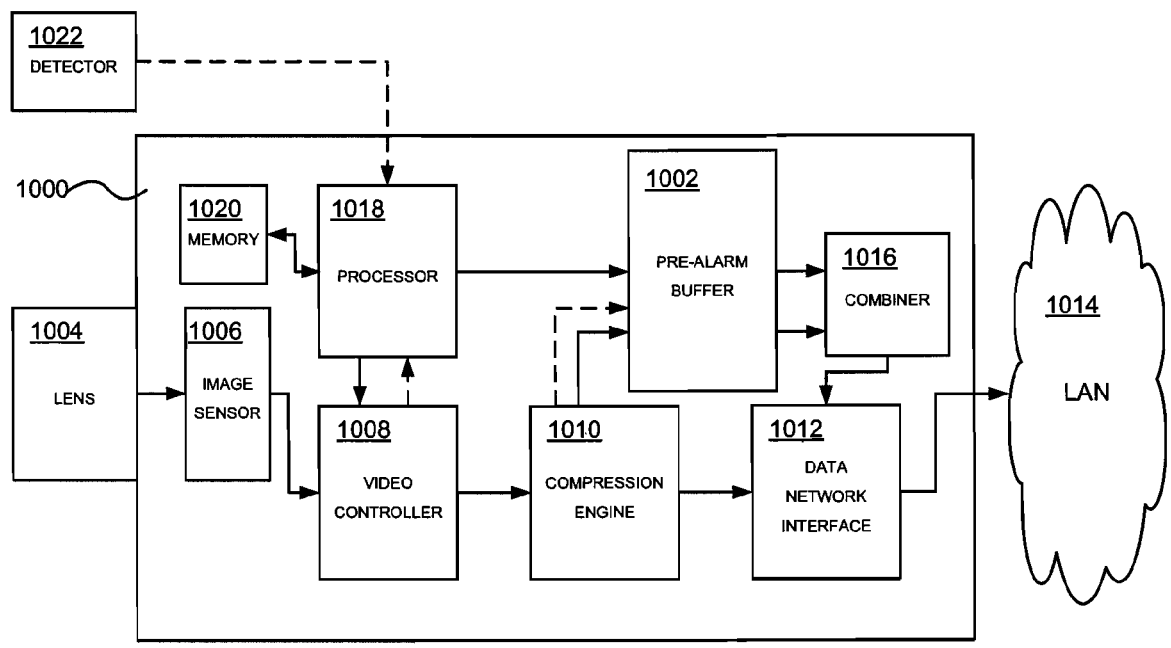
FIG. 10 is a schematic illustration of a surveillance camera comprising a pre-alarm video sequence buffer according to the second, third, fourth or fifth embodiment.

In FIG. 10, a camera 1000 comprising a pre-alarm video sequence buffer 1002, as illustrated in FIG. 5, FIG. 6, FIG. 7 or FIG. 8, is illustrated. The camera 1000 further comprises a lens 1004, an image sensor 1006, a video controller 1008, a compression engine 1010, a data network interface 1012 connected to a LAN (Local Area Network) or the Internet 1014, a combiner 1016, a processor 1018 and a memory 1020, and possibly an external detector 1022.

The difference between the camera 1000 and the camera 900 is the pre-alarm buffer 1002 and the communication between the pre-alarm buffer 1002 and the video controller 1008 and the compression engine 1010.

In the camera 1000, if an alarm video sequence is to be sent automatically upon a detection, the output compressed image frames from the compression engine 1010 are input to the pre-alarm video sequence buffer 1002 continuously until a detection signal is received.

In the embodiments illustrated in FIG. 5, FIG. 6 and FIG. 8 the output compressed image frames are one video signal, i.e. compressed video signal, illustrated as a solid line. However, in the embodiment as illustrated in FIG. 7, the output compressed image frames are two video signals, i.e. the compressed video signal and an F-frame video signal, illustrated as a solid line and a dashed line respectively.

Figure 11:
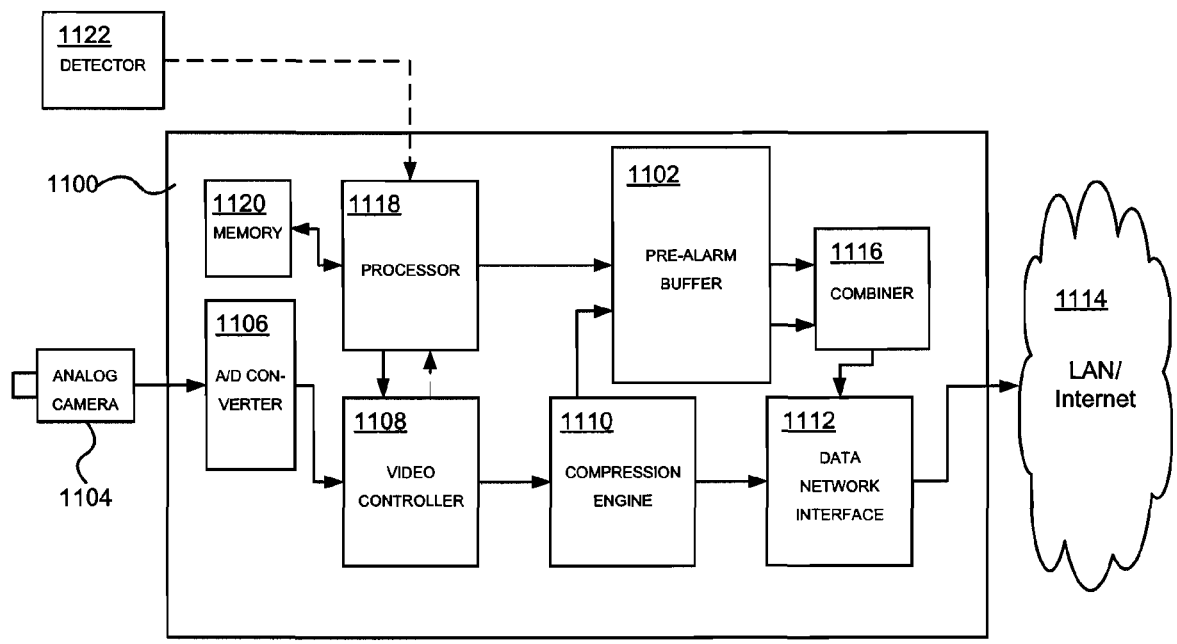
FIG. 11 is a schematic illustration of a video surveillance system comprising a video server connected to an analog camera, wherein the video server comprises a pre-alarm video sequence buffer according to the first embodiment.

In FIG. 11, a surveillance system comprising a video server 1100, which in turn comprises a pre-alarm video sequence buffer 1102 as illustrated in FIG. 4, and analog camera 1104 are illustrated. The video server 1100 comprises an A/D converter 1106, a video controller 1108, a compression engine 1110, a data network interface 1112 connected to a LAN (Local Area Network) or the Internet 1114, a combiner 1116, a processor 1118 and a memory 1120, and possibly an external detector 1122.

The difference between the video server 1100 and the camera 900 is that the lens 904 and the image sensor 906 are replaced by the analog camera 1104 and the A/D converter 1106.

Figure 12:
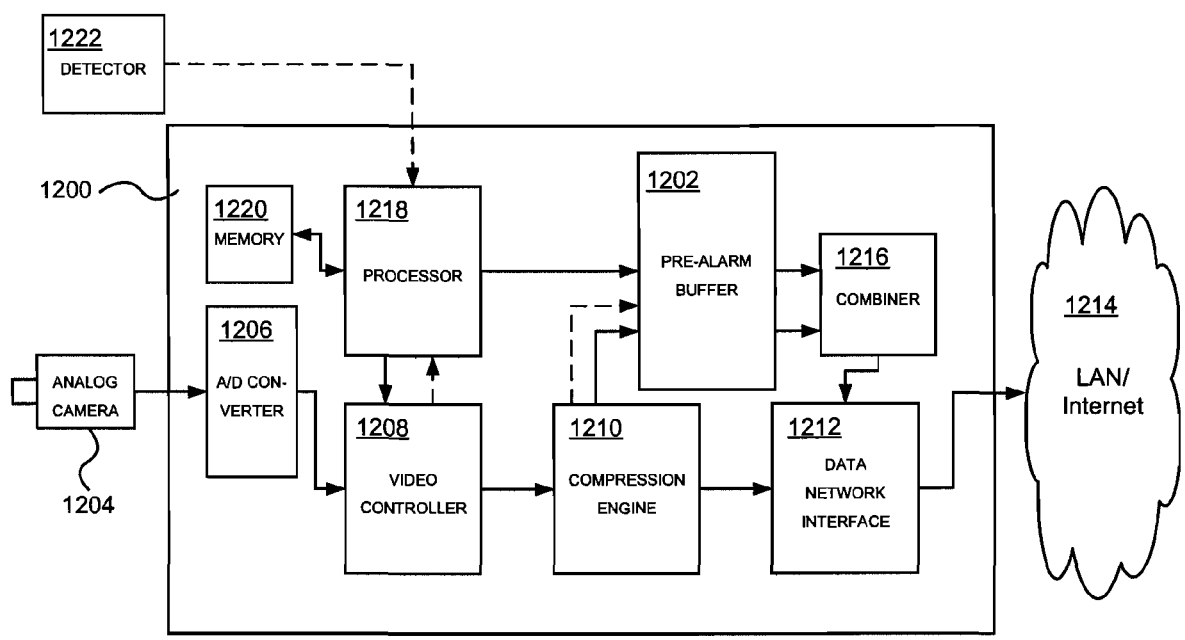
FIG. 12 is a schematic illustration of a video surveillance system comprising a video server connected to an analog camera, wherein the video server comprises a pre-alarm video sequence buffer according to the second, third, fourth or fifth embodiment.

In FIG. 12, a surveillance system comprising a video server 1200, which in turn comprises a pre-alarm video sequence buffer 1202 as illustrated in FIG. 5, FIG. 6, FIG. 7 or FIG. 8, and an analog camera 1204 are illustrated. The video server 1200 comprises an A/D converter 1206, a video controller 1208, a compression engine 1210, a data network interface 1212 connected to a LAN (Local Area Network) or the Internet 1214, a combiner 1216, a processor 1218 and a memory 1220, and possibly an external detector 1222.

The difference between the video server 1200 and the camera 1000 is that the lens 1004 and the image sensor 1006 are replaced by the analog camera 1204 and the A/D converter 1206.

Figure 13:
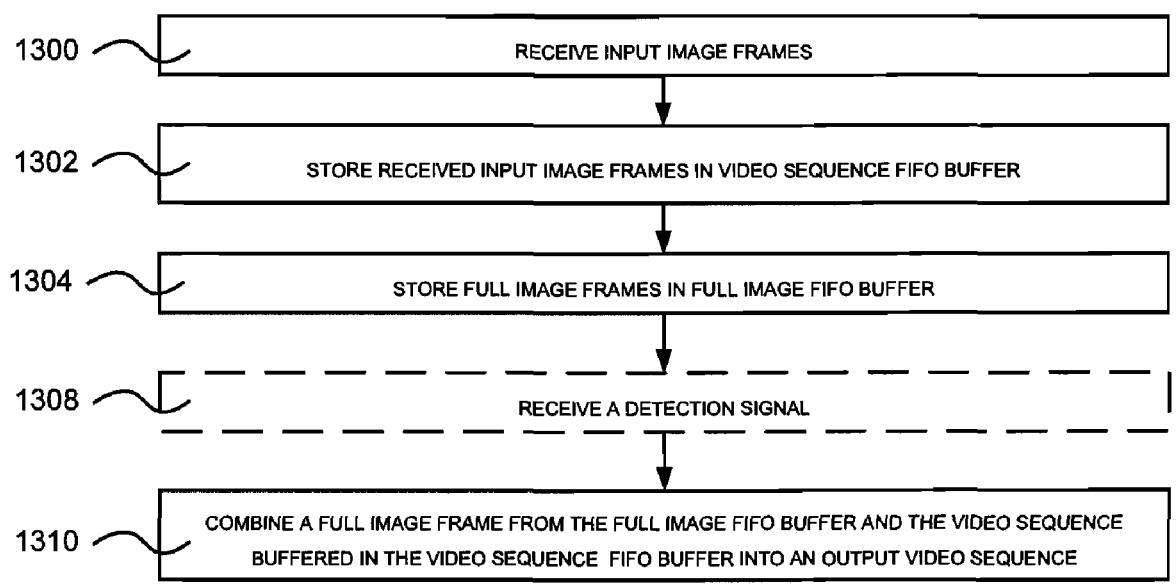
FIG. 13 is a flow chart that illustrates a method for buffering a video sequence.

Referring to FIG. 13, a method for buffering and generating a pre-alarm video sequence is illustrated.

In step 1300, input image frames are received from an external direct connection with an image capturing device, e.g. a camera, a network connection to an image capturing device, or a video compressing engine of an image capturing device, e.g. a camera, including both the compressing engine and the means performing the present process. The input image frames may be a compressed video sequence, i.e. a sequence of differential images occasionally interrupted by a full image comprising full image frames. The input image frame may be a compressed video sequence as mentioned above and an additional input of full image frames representing image frames of the compressed video sequence.

In step 1302, the received input image frames of the compressed video sequence are stored in a video sequence FIFO buffer.

In step 1304, at least one first full image frame is stored in a full image FIFO buffer. The at least one full image frame may be a full image frame that has been calculated from the compressed video sequence of the input image frames or, in case of the input image frames include full image frames representing image frames of the compressed video sequence, a full image frame received as part of the input image frames.

Thereafter, in step 1308, a detection signal indicating an interesting event is received.

In response to the detection signal, step 1310, an output video sequence is generated by combining the oldest full image frame of the full image FIFO buffer with the video sequence stored in the video sequence FIFO buffer. In one embodiment the oldest full image frame in the full image FIFO buffer is a full image version of the oldest image frame of the video sequence FIFO buffer. In another embodiment there may be some temporal distance between the full image frames inserted in the video sequence from the video sequence buffer.

The generation of the output video sequence may be made automatically upon the reception of a detection signal.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for buffering an alarm video sequence, wherein the alarm video sequence comprises a pre-alarm video sequence showing the events before an alarm detection, comprising the acts of:
   receiving input image frames from an input video stream comprising full image frames and differential image frames,
   storing each received input image frame in a video sequence FIFO buffer in response to the receipt of each frame, and
   storing at least one full image frame, being related to the video sequence stored in the video sequence FIFO buffer, in a full image FIFO buffer, and
   generating, in response to the alarm detection, an output alarm video sequence by combining at least one of the full image frames stored in the full image FIFO buffer with the image frames of the video sequence FIFO buffer, wherein at least one of the combined full image frames was received prior to the alarm detection, and
   wherein said at least one full image frame stored in the full image frame FIFO buffer is a full image representation of an image frame having a short temporal distance to the oldest image frame of the video sequence stored in the video sequence FIFO buffer.

2. The method according to claim 1, wherein said at least one full image frame stored in the full image frame FIFO buffer is a full image representation of an image frame stored in said video sequence FIFO buffer.

3. The method according to claim 1, wherein said storing of at least one full image frame in a full image FIFO buffer further comprises:
   combining at least one image frame of said received input image frames with said at least one full image frame, said at least one image frame of said received input image frames being a differential image and representing a later image frame in the video sequence than the at least one full image frame is representing, and
   storing said combined image frames in the full image FIFO buffer.

4. The method according to claim 1, wherein the generation of an output video sequence comprises inserting a full image frame from a full image FIFO buffer as the first frame of a video sequence output from a video sequence FIFO buffer comprising full image frames and differential image frames.

5. The method according to claim 1, wherein said generation of an output video sequence is automatically performed upon receipt of a detection signal.

6. The method according to claim 1, further comprising frequently receiving full image frames from a video sequence encoding means outputting the video stream including the input image frames, each full image frame representing a full image version of an image frame of the input image frames, and wherein the storing of at least one full image frame includes storing each of the received full image frames in the full image FIFO buffer in response to the receipt of each full image frame.

7. The method according to claim 1, wherein storing at least one full image frame includes storing a full image frame of said received input image frames in the full image FIFO buffer.

8. The method according to claim 1, wherein said storing of at least one full image frame in a full image FIFO buffer further comprises:
   combining at least one image frame of said received input image frames with said at least one full image frame, said at least one image frame of said received input image frames being a differential image and representing a later image frame in the video sequence than the at least one full image frame is representing, and
   storing said combined image frames in the full image FIFO buffer.

9. The method according to claim 8, wherein the full image FIFO buffer and the video sequence FIFO buffer stores an equal number of image frames.

10. The method according to claim 8, wherein the full image FIFO buffer stores one image frame.

11. The method according to claim 3, wherein the full image FIFO buffer stores one image frame.

12. The method according to claim 11, wherein the at least one image frame of said received input image frames or the full image frame of said received input image frame is the oldest image frame in the video sequence FIFO buffer.

13. A pre-alarm buffer for buffering a video sequence, wherein the video sequence comprises a pre-alarm video sequence showing the events before an alarm detection, comprising:
   a video sequence FIFO buffer arranged to buffer input image frames from an input video stream,
   a full image FIFO buffer arranged to buffer at least one full image frame, being related to the video sequence FIFO buffer,
   a combiner arranged to combine, in response to the alarm detection, an image frame from the full image FIFO buffer with the image frames of the video sequence FIFO buffer and generate a pre-alarm video sequence, wherein at least one of the combined full image frames was received prior to the alarm detection, and
   wherein said at least one full image frame stored in the full image frame FIFO buffer is a full image representation of an image frame having a short temporal distance to the oldest image frame of the video sequence stored in the video sequence FIFO buffer.

14. The pre-alarm buffer according to claim 13, further comprising a compressed video input arranged to receive a video sequence including full frames and differential frames.

15. The pre-alarm buffer according to claim 13, wherein said at least one full image frame stored in the full image frame FIFO buffer is a full image representation of an image frame stored in said video sequence FIFO buffer.

16. The pre-alarm buffer according to claim 13, further comprising a full frame video input arranged to receive a video sequence including only full frames.

17. The pre-alarm buffer according to claim 13, wherein the combiner is arranged to insert a full image frame from a full image FIFO buffer as the first frame of a video sequence outputted from a video sequence FIFO buffer comprising full image frames and differential image frames.

18. A camera comprising the pre-alarm buffer according to claim 13.

19. A non-transitory computer readable medium, comprising a computer program code that when exectured performs the steps of the method according to claim 1.

20. A video server comprising the pre-alarm buffer according to claim 13.

* * * * *

UNITED STATES PATENT AND TRADEMARK OFFICE
CERTIFICATE OF CORRECTION

PATENT NO. : 8,384,830 B2
APPLICATION NO. : 11/775013
DATED : February 26, 2013
INVENTOR(S) : Joacim Tullberg Page 1 of 1

It is certified that error appears in the above-identified patent and that said Letters Patent is hereby corrected as shown below:

IN THE CLAIMS

In claim 19, column 14, line 32, after the word "when", delete "exectured" and insert therefor --executed--.

Signed and Sealed this
Seventeenth Day of September, 2013

Teresa Stanek Rea
*Deputy Director of the United States Patent and Trademark Office*